(12) United States Patent
Park et al.

(10) Patent No.: US 10,192,444 B2
(45) Date of Patent: Jan. 29, 2019

(54) FORWARD COLLISION WARNING SYSTEM AND METHOD

(71) Applicant: PLK Technologies Co., Ltd., Seoul (KR)

(72) Inventors: Kwang Il Park, Seoul (KR); Sang Mook Lim, Seoul (KR); Jin Hyuck Kim, Seoul (KR)

(73) Assignee: PLK TECHNOLOGIES CO., LTD., Seoul (KR)

( * ) Notice: Subject to any disclaimer, the term of this patent is extended or adjusted under 35 U.S.C. 154(b) by 6 days.

(21) Appl. No.: 15/560,280

(22) PCT Filed: Apr. 27, 2016

(86) PCT No.: PCT/KR2016/004383
§ 371 (c)(1),
(2) Date: Sep. 21, 2017

(87) PCT Pub. No.: WO2016/190555
PCT Pub. Date: Dec. 1, 2016

(65) Prior Publication Data
US 2018/0075749 A1 Mar. 15, 2018

(30) Foreign Application Priority Data

May 26, 2015 (KR) .......................... 10-2015-0072668

(51) Int. Cl.
*G06K 9/00* (2006.01)
*G08G 1/16* (2006.01)
(Continued)

(52) U.S. Cl.
CPC ............. *G08G 1/166* (2013.01); *B60W 30/08* (2013.01); *B60W 40/02* (2013.01); *B60W 50/14* (2013.01);
(Continued)

(58) Field of Classification Search
CPC .................................................. G06K 2209/21
See application file for complete search history.

(56) References Cited

U.S. PATENT DOCUMENTS 9,096,167 B2 * 8/2015 Stein ........................ G08G 1/16
2006/0256198 A1 11/2006 Nishiuchi
(Continued)

FOREIGN PATENT DOCUMENTS

JP 4052291 B2 2/2008
JP 4544028 B2 9/2010
(Continued)

*Primary Examiner* — Oneal R Mistry
(74) *Attorney, Agent, or Firm* — Rabin & Berdo, P.C.

(57) ABSTRACT

A forward collision warning method may include the steps of: (a) extracting a contour candidate point of an object considered as the forward vehicle from an image taken by a camera; (b) tracking a movement of the contour candidate point over time; (c) determining whether the contour candidate point belongs to the vehicle; (d) setting the contour candidate point to a vehicle contour point of the forward vehicle, when it is determined at the step (c) that the contour candidate point belongs to the vehicle; (e) estimating a height of the vehicle contour point from the ground surface; (f) calculating a relative distance to the forward vehicle through Equation below; and (g) calculating a time to collision (TTC) using the relative distance:

$$Z = \lambda \frac{h - Yc}{yc}. \quad \text{Equation}$$

9 Claims, 8 Drawing Sheets

(51) Int. Cl.
*B60W 50/14* (2012.01)
*B60W 30/08* (2012.01)
*B60W 40/02* (2006.01)
*G06K 9/46* (2006.01)
*G06K 9/78* (2006.01)

(52) U.S. Cl.
CPC ..... *G06K 9/00335* (2013.01); *G06K 9/00805* (2013.01); *G06K 9/4604* (2013.01); *G06K 9/78* (2013.01); *G06K 2209/21* (2013.01)

(56) References Cited

U.S. PATENT DOCUMENTS

| | | | |
|---|---|---|---|
| 2008/0166024 A1* | 7/2008 | Iketani | B60R 1/00 |
| | | | 382/107 |
| 2014/0002656 A1* | 1/2014 | Woo | G08G 1/167 |
| | | | 348/148 |
| 2014/0002657 A1* | 1/2014 | Kim | B60Q 9/008 |
| | | | 348/148 |

FOREIGN PATENT DOCUMENTS

| | | |
|---|---|---|
| JP | 2012-098776 A | 5/2012 |
| KR | 10-1996-0000621 A | 1/1996 |
| KR | 10-2008-0004926 A | 1/2008 |
| KR | 10-2013-0007243 A | 1/2013 |

* cited by examiner

FORWARD COLLISION WARNING SYSTEM AND METHOD

TECHNICAL FIELD

The present disclosure relates to a forward collision warning system and method, and more particularly, to a forward collision warning system and method which can track a contour point of a forward vehicle and correctly calculate a time to collision (TTC), even when the bottom of the forward vehicle is not detected because the forward vehicle is too close to an ego vehicle.

BACKGROUND ART

In order to prevent a safety accident during driving, a forward collision warning system calculates a safety distance from a forward vehicle, and generates an alarm to warn a driver when a collision is likely to occur. The forward collision warning system senses the forward vehicle through a sensor or camera, and calculates a relative distance or relative velocity between the ego vehicle and the forward vehicle. Then, the forward collision warning system calculates a time to collision (TTC) from the relative distance and the relative velocity, and warns of a collision with the forward vehicle using the TTC.

For example, as illustrated in FIG. 1, an image taken by a camera mounted on a vehicle traveling on the road 10 shows a forward situation. When a forward vehicle 12 is present in the image, the forward vehicle 12 may be detected through the following process. First, the forward collision warning system acquires a forward image through the camera, and performs inverse filtering on the acquired image in order to distinguish the forward vehicle 12 from other objects. Then, the forward collision warning system recognizes the shape of the forward vehicle 12, and determines whether the forward vehicle 12 is a vehicle. When it is determined that the forward vehicle 12 is a vehicle, the forward collision warning system recognizes the bottom of a rear wheel or the end of a lower shadow area of the forward vehicle 12 as a distance reference point, and calculates a relative distance to the forward vehicle 12 based on the distance reference point.

In FIG. 2, the left drawing includes a coordinate axis indicating an actual position of the forward vehicle 12 relative to the ego vehicle 14, and the right drawing includes a coordinate axis in an image taken by the camera of the ego vehicle 14. Here, the origin point corresponds to a vanishing point. Since the distance reference point is set to the bottom of the rear wheel or the end of the lower shadow area of the forward vehicle 12 as described above, 'Y=0' in the coordinate axis of the forward vehicle 12. Thus, the forward collision warning system can simply calculate the relative distance to the forward vehicle as expressed by Equation 1 below.

$$Z = \lambda \frac{h}{y} \quad \text{[Equation 1]}$$

In Equation 1, Z represents the relative distance between the ego vehicle and the forward vehicle, $\lambda$ represents a focal distance of the camera, h represents the height of the camera, and y represents the height of the distance reference point on the camera.

When the relative distance calculation is repeated in successive images, the relative velocity may be calculated through Equation 2 below.

$$v = \frac{Z_{t+\Delta t} - Z_t}{\Delta t} \quad \text{[Equation 2]}$$

In Equation 2, v represents the relative velocity of the ego vehicle relative to the forward vehicle, $Z_t$ represents a relative distance at time t, and $Z_{t+\Delta t}$ represents a variation of the relative distance depending on a time variation $\Delta t$.

When a TTC obtained by dividing the relative distance by the relative velocity is less than a threshold value as expressed by Equation 3 below, the forward collision warning system warns of a collision risk.

$$TTC = \frac{Z}{v} < TTC_{threshold} \quad \text{[Equation 3]}$$

In Equation 3, TTC represents a time to collision, and $TTC_{threshold}$ represents the threshold value of the TTC.

The conventional forward collision warning system can easily acquire the relative distance. As illustrated in FIG. 3, however, when the conventional forward collision warning system cannot detect the rear wheel of the forward vehicle because the forward vehicle is too close to the ego vehicle, the conventional forward collision warning system may not acquire the distance reference point or cause a misrecognition. Such a situation may frequently occur when the vehicle is driven at low speed. Furthermore, since a collision warning is not generated in time, a collision accident may occur.

Korean Patent Publication No. 10-2013-0007243 discloses a forward collision warning method and system capable of successfully recognizing a forward vehicle under various illumination intensities or road conditions. Referring to the related art document, the forward collision warning method and system minimizes the load of a CPU through vehicle recognition and tracking. However, a vehicle tracking unit of the related art document detects the bottom of a forward vehicle recognized by a forward vehicle recognition unit and sets the bottom of the forward vehicle to a feature point of the forward vehicle. Therefore, when the forward vehicle is too close to the ego vehicle as illustrated in FIG. 2, the forward collision warning method and system cannot acquire a feature point, and may fail to generate a collision warning.

RELATED ART DOCUMENT

Patent Document (Patent Document 1) Korean Patent Publication No. 10-2013-0007243

DISCLOSURE

Technical Problem

Various embodiments are directed to a forward collision warning system and method which can track an unspecific contour point instead of a lower end of a forward vehicle, determine whether the contour point belongs to the vehicle, track a relative distance and height of the contour point, calculate the relative distance even when a distance reference point cannot be acquired, and generate a collision warning in time even during low sped operation, thereby preventing a vehicle accident.

Technical Solution

In an embodiment, there is provided a forward collision warning method that detects a forward vehicle and warns of a collision with the forward vehicle. The forward collision warning method may include the steps of: (a) extracting a contour candidate point of an object considered as the forward vehicle from an image taken by a camera; (b) tracking a movement of the contour candidate point over time; (c) determining whether the contour candidate point belongs to the vehicle; (d) setting the contour candidate point to a vehicle contour point of the forward vehicle, when it is determined at the step (c) that the contour candidate point belongs to the vehicle; (e) estimating a height of the vehicle contour point from the ground surface; (f) calculating a relative distance to the forward vehicle through Equation 6 below; and (g) calculating a time to collision (TTC) using the relative distance:

$$Z = \lambda \frac{h - Y_c}{y_c},\quad \text{Equation 6}$$

where Z represents the relative distance between an ego vehicle and the forward vehicle, λ represents a focal distance of the camera, h represents a height of the camera, Yc represents the height of the vehicle contour point from the ground surface, and yc represents the height of the vehicle contour point in the image taken by the camera.

The step (a) comprises extracting a point at which a horizontal edge and a vertical edges cross each other in the image taken by the camera, as the contour candidate point.

The step (b) comprises the steps of: (b-1) defining a first block having a plurality of pixels around the contour candidate point in a first image; (b-2) defining a second block having the same size as the first block in a second image after a predetermined passage of time from the first image; (b-3) determining whether a pixel value of the second block coincides with a pixel value of the first block, while moving the second block to around the contour candidate point based on the same position as the first block in the second image; and (b-4) determining that the contour candidate point has moved in the corresponding block, when it is determined at the step (b-3) that the pixel value of the second block coincides with the pixel value of the first block.

The step (c) comprises the steps of: (c-1) extracting the bottom of a rear wheel or the end of a lower shadow area of the forward vehicle, and recognizing the bottom of the rear wheel or the end of the lower shadow area as a distance reference point; (c-2) subtracting a relative distance to the distance reference point from a relative distance to the contour candidate point through Equation 4 below; (c-3) determining whether the subtraction result of the step (c-2) is constant over time within a predetermined error range; and (c-4) determining that the corresponding contour candidate point belongs to the vehicle, when it is determined at the step (c-3) that the subtraction result of the step (c-2) is not constant over time:

$$Zc0 - Z0 = \lambda \frac{h}{yc0} - \lambda \frac{h}{y0},\quad \text{Equation 4}$$

where Zc0 represents the relative distance to the contour candidate point, Z0 represents the relative distance to the distance reference point, yc0 represents the height of the contour candidate point in the image taken by the camera, and y0 represents the height of the distance reference point in the image taken by the camera.

The step (c) comprises the steps of: (c-1) extracting the bottom of a rear wheel or the end of a lower shadow area of the forward vehicle, and recognizing the bottom of the rear wheel or the end of the lower shadow area as a distance reference point; (c-2) calculating a height of the contour candidate point relative to the distance reference point through Equation 5 below; (c-3) determining whether the calculation result of the step (c-2) is constant over time within a predetermined error range; and (c-4) determining that the corresponding contour candidate point belongs to the vehicle, when it is determined at the step (c-3) that the calculation result of the step (c-2) is constant over time:

$$Yc0 = h\left(1 - \frac{yc0}{y0}\right),\quad \text{Equation 5}$$

where Yc0 represents the height of the contour candidate point, yc0 represents a height of the contour candidate point in the image taken by the camera, and y0 represents a height of the distance reference point in the image taken by the camera.

In other embodiment, there is provided a forward collision warning system that detects a forward vehicle and warns of a collision with the forward vehicle, the forward collision warning system comprising: a camera configured to take an image of a forward situation of a vehicle; a contour candidate point extraction unit configured to extract a contour candidate point of an object considered as a forward vehicle from the image taken by the camera; a contour point determination unit configured to track a movement of the contour candidate point, determine whether the contour candidate point belongs to the vehicle, and set the contour candidate point to a vehicle contour point when the contour candidate point belongs to the vehicle; a relative distance calculation unit configured to calculate a relative distance to the forward vehicle based on the vehicle contour point using Equation 6 below; and a TTC calculation unit configured to calculate a TTC using the relative distance calculated by the relative distance calculation unit:

$$Z = \lambda \frac{h - Y_c}{y_c},\quad \text{Equation 6}$$

where Z represents the relative distance between an ego vehicle and the forward vehicle, λ represents a focal distance of the camera, h represents a height of the camera, Yc represents a height of the vehicle contour point from the ground surface, and yc represents a height of the vehicle contour point in the image taken by the camera.

The contour candidate point extraction unit extracts a point at which a horizontal edge and a vertical edge cross each other in the image taken by the camera, as the contour candidate point.

The contour point determination unit comprises a relative distance tracking unit configured to extract the bottom of a rear wheel or the end of a lower shadow area of the forward vehicle, recognize the bottom of the rear wheel or the end of the lower shadow area as a distance reference point, determine whether a result obtained by subtracting a relative distance to the distance reference point from a relative distance to the contour candidate point through Equation 4 below is constant over time, and determine that the corresponding contour candidate point belongs to the vehicle, when the subtraction result is not constant over time:

$$Zc0 - Z0 = \lambda \frac{h}{yc0} - \lambda \frac{h}{y0},\qquad \text{Equation 4}$$

where Zc0 represents the relative distance to the contour candidate point, Z0 represents the relative distance to the distance reference point, yc0 represents a height of the contour candidate point in the image taken by the camera, and y0 represents a height of the distance reference point in the image taken by the camera.

The contour point determination unit comprises a height tracking unit configured to extract the bottom of a rear wheel or the end of a lower shadow area of the forward vehicle, recognize the bottom of the rear wheel or the end of the lower shadow area as the distance reference point, determine whether a height of the contour candidate point relative to the distance reference point through Equation 5 below is constant over time, and determine that the contour candidate point belongs to the vehicle, when the height of the contour candidate point is constant over time:

$$Yc0 = h\left(1 - \frac{yc0}{y0}\right),\qquad \text{Equation 5}$$

where Yc0 represents the height of the contour candidate point, yc0 represents the height of the contour candidate point in the image taken by the camera, and y0 represents a height of the distance reference point in the image taken by the camera.

Advantageous Effects

In accordance with the present embodiment, the forward collision warning system and method can track a contour point of a forward vehicle, determine whether the contour point belongs to the vehicle, track a relative distance and height of the contour point, calculate the relative distance based on the height of the contour point even when a distance reference point of the lower end of the forward vehicle cannot be acquired, calculate the relative distance to the forward vehicle close to an ego vehicle, and issue a collision warning to a driver even when the forward vehicle is close to the ego vehicle.

MODE FOR INVENTION

Figure 1:
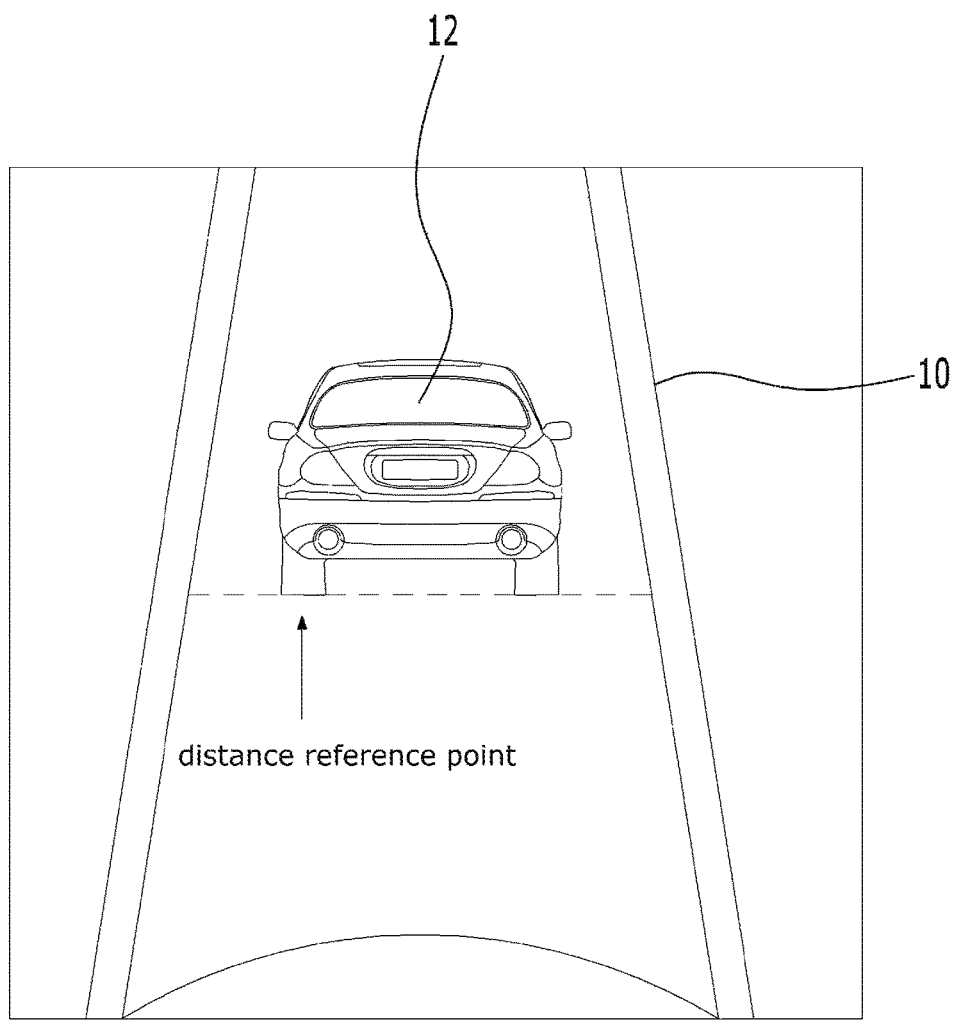
FIG. 1 illustrates that a conventional forward collision warning system acquires a distance reference point.
Figure 2:
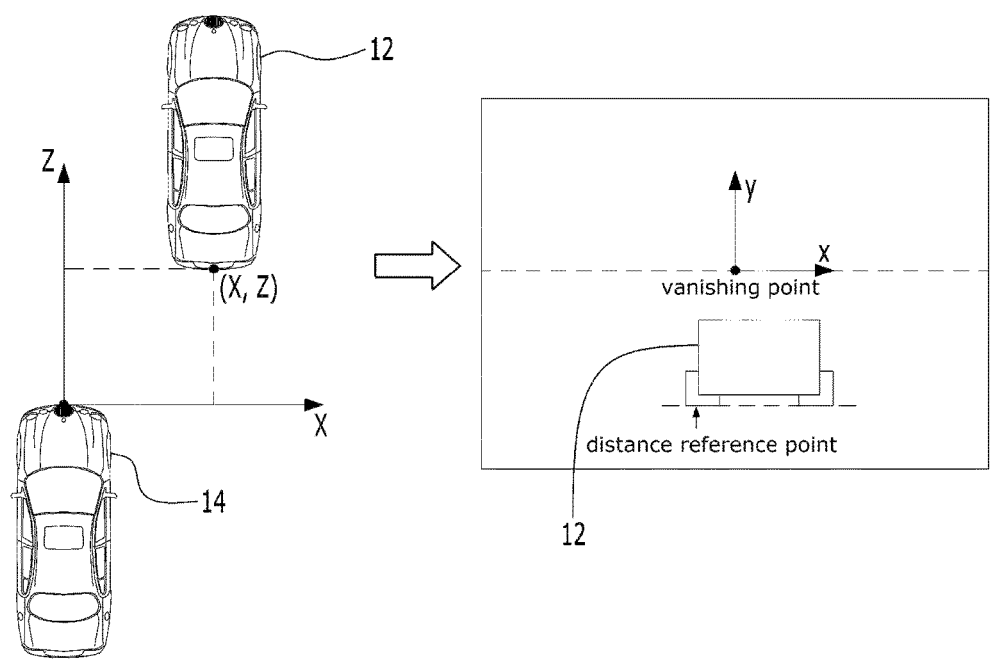
FIG. 2 illustrates that the conventional forward collision warning system calculates a relative distance.
Figure 3:
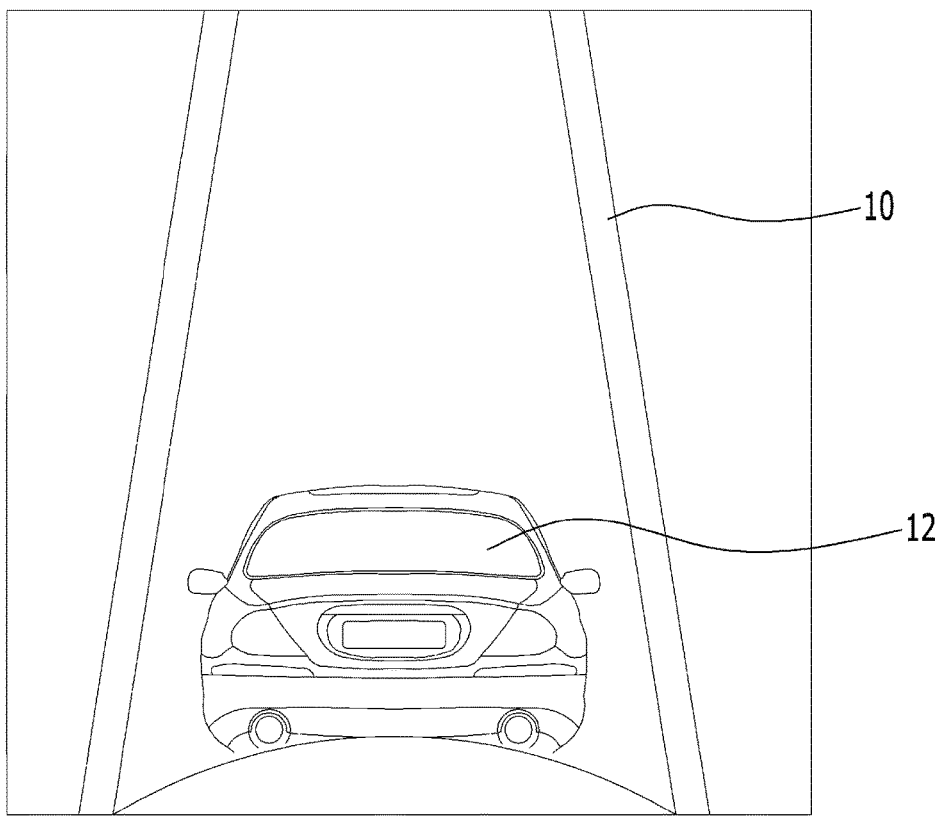
FIG. 3 illustrates that the forward collision warning system cannot acquire a distance reference point.

Hereafter, exemplary embodiments of the present invention will be described with reference to the accompanying drawings. However, the present invention is not limited to specific embodiments, and may include all variations, equivalents and substitutes within the scope of the present invention.

Throughout the specification, the same components are represented by like reference numerals. The accompanying drawings of this specification are for convenience of descriptions, and the shapes and relative scales thereof may be exaggerated or omitted.

When the embodiments are described in detail, the duplicated descriptions or the descriptions of techniques publicly known to those skilled in the art are omitted herein. In the following descriptions, when an element is referred to as "including" another element, the element may further include other elements unless referred to the contrary.

The terms "~unit", "~er" and "~module" described in the specification may indicate a unit for processing one or more functions or operations, and the unit can be embodied by hardware, software or a combination of hardware and software. Furthermore, when an element is referred to as being electrically connected to another element, it may not only indicate that the former element is directly connected to the latter element, but also indicate that the former element is connected to the latter element with another element interposed therebetween.

Figure 4:
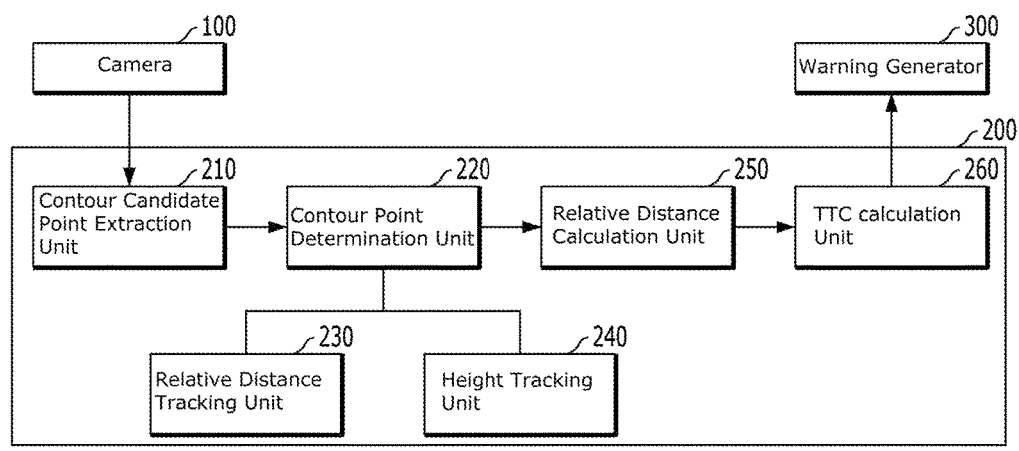
FIG. 4 is a block diagram illustrating a forward collision warning system in accordance with an embodiment of the present invention.

FIG. 4 is a block diagram illustrating a forward collision warning system in accordance with an embodiment of the present invention. Referring to FIG. 4, the forward collision warning system in accordance with the embodiment of the present invention includes a camera 100, an image processor 200 and a warning generator 300. The camera 100 takes an image of a forward situation of a vehicle, the image processor 200 processes the image taken by the camera 100 and calculates a time to collision (TTC), and the warning generator 300 generates a collision warning according to an output of the image processor 200.

As illustrated in FIG. 4, the image processor 200 includes a contour candidate point extraction unit 210, a contour point determination unit 220, a relative distance tracking unit 230, a height tracking unit 240, a relative distance calculation unit 250 and a TTC calculation unit 260.

The contour candidate point extraction unit 210 extracts a contour candidate point of an object considered as a forward vehicle from an image taken by the camera 100. The contour point determination unit 220 determines whether the contour candidate point extracted by the contour candidate point extraction unit 210 belongs to the vehicle. As illustrated in FIG. 4, the contour point determination unit 220 includes the relative distance tracking unit 230 and the height tracking unit 240.

The relative distance calculation unit 250 calculates a relative distance to a vehicle contour point after the contour point determination unit 220 determined the vehicle contour point. The TTC calculation unit 260 calculates a TTC using the relative distance to the vehicle contour point.

Figure 5:
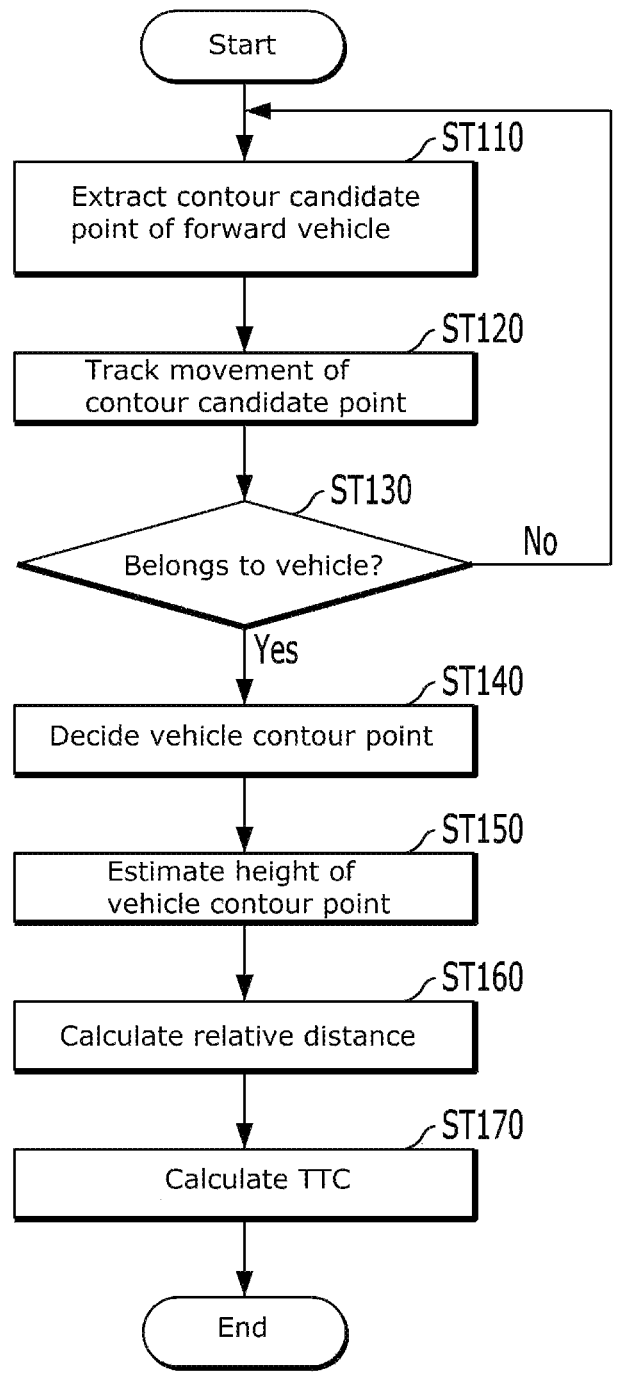
FIG. 5 is a flowchart illustrating a forward collision warning method in accordance with an embodiment of the present invention.
Figure 6:
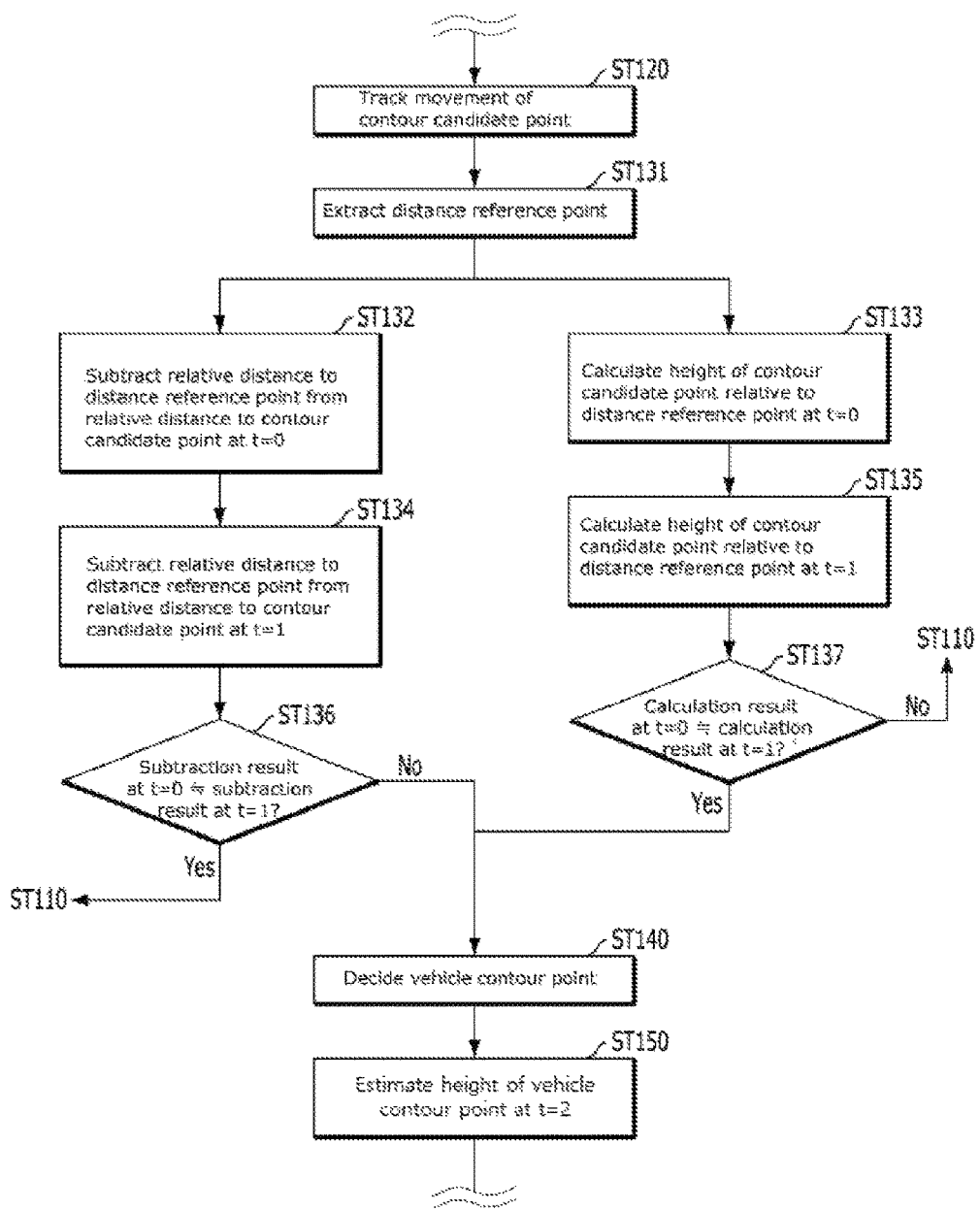
FIG. 6 is a flowchart illustrating a process of determining whether a contour candidate point belongs to a vehicle.

FIG. 5 is a flowchart illustrating a forward collision warning method in accordance with an embodiment of the present invention, and FIG. 6 is a flowchart illustrating a process of determining whether a contour candidate point belongs to the vehicle. Referring to FIGS. 5 and 6, the operation relations of the respective units and the forward collision warning method in accordance with the present embodiment will be described in more detail as follows.

First, the contour candidate point extraction unit 210 of the image processor 200 receives image information from the camera 100, and extracts a contour candidate point of an object considered as a forward vehicle, at step ST110. For example, the contour candidate point extraction unit 210 extracts a point at which a horizontal edge and a vertical edge crosses each other in the image taken by the camera 100, as the contour candidate point.

Then, the contour point determination unit 220 tracks a movement of the contour candidate point at step ST120. For example, the contour point determination unit 220 defines a first block including a plurality of pixels around the contour candidate point in a first image from which the contour candidate point was extracted. Then, the contour point determination unit 220 defines a second block having the same size as the first block in a second image acquired after a predetermined time. While moving the second block of the second image to around the contour candidate point based on the same position as the first block, the contour point determination unit 220 determines whether a pixel value of the second block coincides with a pixel value of the first block. For example, the contour point determination unit 220 may move the second block of the second image along a whirlwind shape. When the pixel value of the second block coincides with the pixel block of the first block, the contour point determination unit 220 determines that the contour candidate point has moved in the corresponding block.

Then, the contour point determination unit 220 determines whether the contour candidate point belongs to the vehicle, at step ST130. The process of determining whether the contour candidate point belongs to the vehicle may be performed through the following two methods or any one of the following two methods.

The first method is to track the relative distance to the contour candidate point through the relative distance tracking unit 230, and the second method is to track the height of the contour candidate point through the height tracking unit 240.

Figure 7:
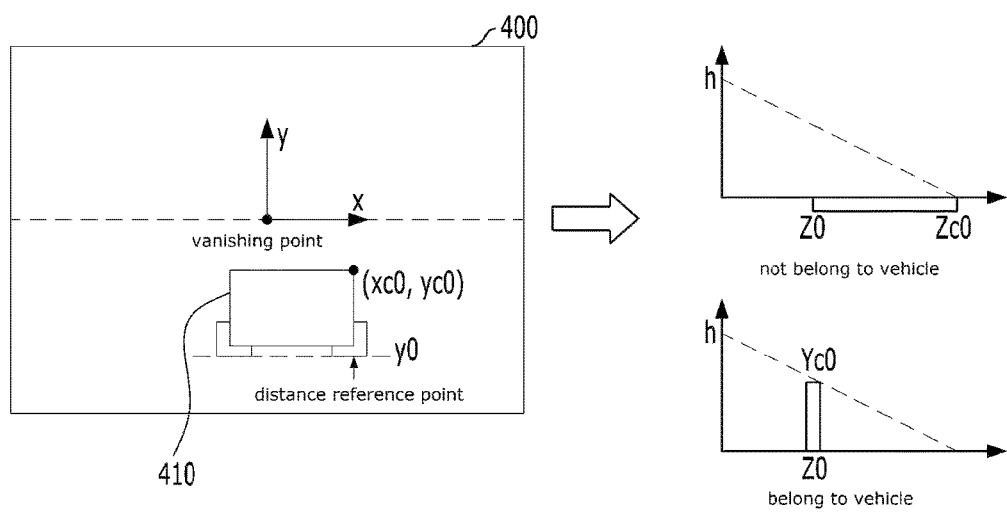
FIG. 7 illustrates an example of the process of determining whether a contour candidate point belongs to the vehicle.

FIG. 7 illustrates an example of the process of determining whether a contour candidate point belongs to the vehicle. FIG. 7 may be based on the supposition that a contour candidate point (xc0, yc0) considered as a portion of a forward vehicle 410 is present in an image 400 taken by the camera 100 as illustrated in the left drawing of FIG. 7. In FIG. 7, the origin point corresponds to the vanishing point, and the coordinate value (xc0, yc0) of the contour candidate point is a coordinate value of the x- and y-axes based on the vanishing point in the image. The y-axis coordinate value of a distance reference point corresponding to the bottom of a rear wheel or the end of a lower shadow area of the forward vehicle is represented by y0.

When the contour candidate point (xc0, yc0) of FIG. 7 does not belong to the vehicle, the contour candidate point is projected onto a point Zc0 on the road by the camera 100 as illustrated in the right top graph of FIG. 7. When the Z-axis coordinate value of the distance reference point on the actual coordinate axis is represented by Z0, an object on the road has a length corresponding to a subtraction of Z0 from Zc0, and the length may be expressed as Equation 4 below.

$$Zc0 - Z0 = \lambda \frac{h}{yc0} - \lambda \frac{h}{y0} \qquad \text{[Equation 4]}$$

In Equation 4, Zc0 represents a relative distance to the contour candidate point, Z0 represents a relative distance to the distance reference point, yc0 represents the height of the contour candidate point in the image taken by the camera, and y0 represents the height of the distance reference point in the image taken by the camera.

When the contour candidate point (xc0, yc0) of FIG. 7 belongs to the vehicle, the contour candidate point is projected onto a point corresponding to the height Yc0 on the Z-axis distance Z0 of the distance reference point as illustrated in the right bottom graph of FIG. 7, and the height may be expressed as Equation 5.

$$Yc0 = h\left(1 - \frac{yc0}{y0}\right) \qquad \text{[Equation 5]}$$

In Equation 5, Yc0 represents the height of the contour candidate point, yc0 represents the height of the contour candidate point in the image taken by the camera, and y0 represents the height of the distance reference point in the image taken by the camera.

When the subtraction result of Equation 4 over time is constant within a predetermined error range, the corresponding contour candidate point may be determined to be an object on the road. In this case, it may be considered that the extracted contour candidate point does not belong to the vehicle. Furthermore, when the height of Equation 5 over time is constant within a predetermined error range, the corresponding contour candidate point may be determined to be a portion of the vehicle. In this case, it may be considered that the extracted contour candidate point belongs to the vehicle.

Referring back to FIG. 6, step ST130 of determining whether the contour candidate point belongs to the vehicle begins with step ST131 of extracting the distance reference point.

The first relative distance tracking process is performed as follows. The contour point determination unit 220 subtracts the relative distance to the distance reference point from the relative distance to the contour candidate point through Equation 4 at 't=0' at step ST132, and performs the same subtraction through Equation 4 at 't=1' after a predetermined time at step ST134. Then, the contour point determination unit 220 determines whether the subtraction result at 't=0' and the subtraction result at 't=1' are equal to each other within a predetermined error range, at step ST136. When the subtraction result at 't=0' and the subtraction result at 't=1' are equal to each other, the procedure returns to the step ST110 to extract a new contour candidate point. On the other hand, when the subtraction result at 't=0' and the subtraction result at 't=1' are not equal to each other, the contour point determination unit 220 sets the corresponding contour candidate point to a vehicle contour point at step ST140.

The second height tracking process is performed as follows. The contour point determination unit 220 calculates the height of the contour candidate point relative to the distance reference point through Equation 5 at 't=0' at step ST133, and performs the same height calculation through Equation 5 at 't=1' after a predetermined time at step ST135. Then, the contour point determination unit 220 determines whether the calculation result at 't=0' and the calculation result at 't=1' are equal to each other within a predetermined error range, at step ST136. When the calculation result at 't=0' and the calculation result at 't=1' are not equal to each other, the contour point determination unit 220 sets the corresponding contour candidate point to a vehicle contour point at step ST140. On the other hand, when the calculation result at 't=0' and the calculation result at 't=1' are not equal to each other, the procedure returns to the step ST110 to extract a new contour candidate point.

Figure 8:
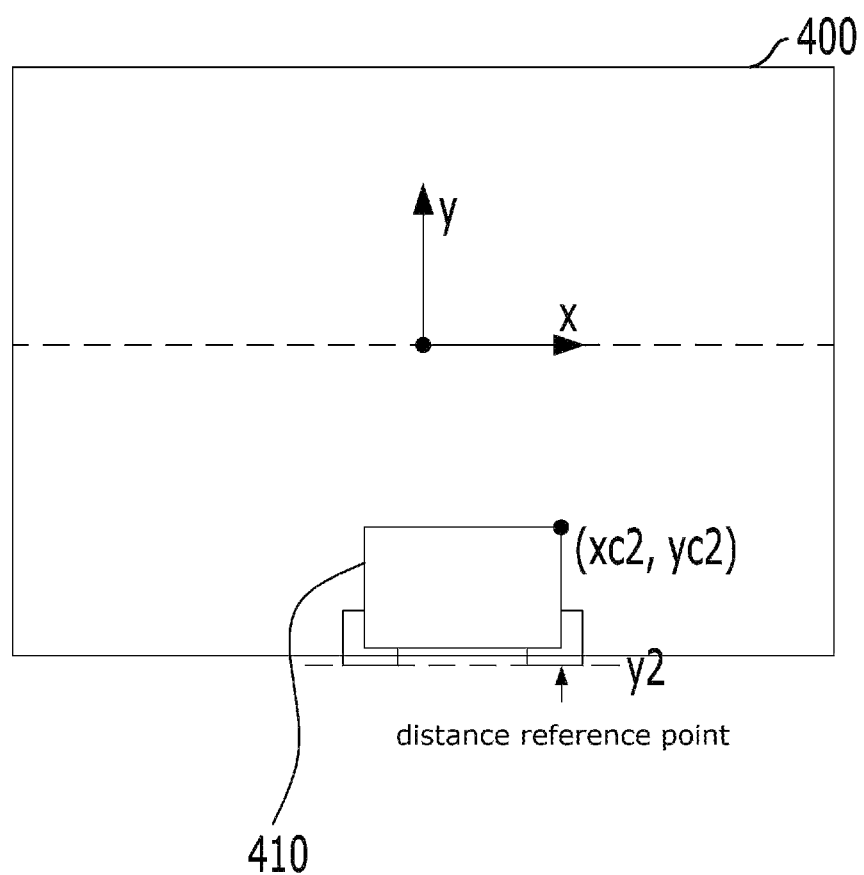
FIG. 8 illustrates that the forward collision warning system calculates a relative distance when a distance reference point cannot be acquired.

Then, the contour point determination unit 220 estimates the height of the vehicle contour point at ST150. At this time, the height of the vehicle contour point may be estimated when the distance reference point cannot be acquired in the image 400 as illustrated in FIG. 8. When the distance reference point can be acquired, the relative distance calculation unit 250 can calculate the relative distance to the distance reference point through Equation 1 above. However, when the distance reference point cannot be acquired as illustrated in FIG. 8 after the contour candidate point was tracked and set to the vehicle contour point, the relative distance calculation unit 250 estimates the height of the vehicle contour point at step ST150.

The relative distance calculation unit 250 calculates the relative distance to the forward vehicle through Equation 6 below.

$$Z = \lambda \frac{h - Yc}{yc} \quad \text{[Equation 6]}$$

In Equation 6, Z represents the relative distance between the ego vehicle and the forward vehicle, λ represents the focal distance of the camera, h represents the height of the camera, Yc represents the height of the vehicle contour point from the ground surface, and yc represents the height of the vehicle contour point in the image taken by the camera.

Then, the TTC calculation unit 260 calculates a TTC using the relative distance calculated at step ST160, at step ST170. The forward collision warning system and method in accordance with the present embodiments provide the process of calculating a relative distance, when the distance reference point cannot be acquired. Then, the TTC calculation process may be performed in the same manner as a publicly known forward collision warning method. For example, when the relative distance calculation is repeated in successive images, a relative velocity may be calculated by Equation 7 below.

$$v = \frac{Z_{t+\Delta t} - Z_t}{\Delta t} \quad \text{[Equation 7]}$$

In Equation 7, v represents the relative velocity of the ego vehicle with respect to the forward vehicle, $Z_t$ represents a relative distance at time t, and $Z_{t+\Delta t}$ represents a variation of the relative distance depending on a time variation Δt.

When the TTC obtained by dividing the relative distance by the relative velocity is less than a threshold value as expressed by Equation 8 below, the forward collision warning system generates a collision warning.

$$TTC = \frac{Z}{v} < TTC_{threshold} \quad \text{[Equation 8]}$$

In Equation 8, TTC represents a time to collision, and $TTC_{threshold}$ represents the threshold value of the TTC.

When the TTC calculation unit 260 calculates the TTC and outputs a warning signal, the warning generator 300 may output a warning sound while outputting a collision warning screen through a navigation system or image display device in the vehicle.

While various embodiments have been described above, it will be understood to those skilled in the art that the embodiments described are by way of example only. Accordingly, the disclosure described herein should not be limited based on the described embodiments.

What is claimed is:

1. A forward collision warning method that detects a forward vehicle and warns of a collision with the forward vehicle, the forward collision warning method comprising the steps of:
   (a) extracting a contour candidate point of an object considered as the forward vehicle from an image taken by a camera;
   (b) tracking a movement of the contour candidate point over time;
   (c) determining whether the contour candidate point belongs to the vehicle;
   (d) setting the contour candidate point to a vehicle contour point of the forward vehicle, when it is determined at the step (c) that the contour candidate point belongs to the vehicle;
   (e) estimating a height of the vehicle contour point from the ground surface;
   (f) calculating a relative distance to the forward vehicle through Equation 6 below; and
   (g) calculating a time to collision (TTC) using the relative distance:

$$Z = \lambda \frac{h - Yc}{yc}, \quad \text{Equation 6}$$

where Z represents the relative distance between an ego vehicle and the forward vehicle, λ represents a focal distance of the camera, h represents a height of the camera, Yc represents the height of the vehicle contour point from the ground surface, and yc represents the height of the vehicle contour point in the image taken by the camera.

2. The forward collision warning method of claim 1, wherein the step (a) comprises extracting a point at which a horizontal edge and a vertical edges cross each other in the image taken by the camera, as the contour candidate point.

3. The forward collision warning method of claim 1, wherein the step (b) comprises the steps of:
   (b-1) defining a first block having a plurality of pixels around the contour candidate point in a first image;
   (b-2) defining a second block having the same size as the first block in a second image after a predetermined passage of time from the first image;
   (b-3) determining whether a pixel value of the second block coincides with a pixel value of the first block, while moving the second block to around the contour candidate point based on the same position as the first block in the second image; and (b-4) determining that the contour candidate point has moved in the corresponding block, when it is determined at the step (b-3) that the pixel value of the second block coincides with the pixel value of the first block.

4. The forward collision warning method of claim 1, wherein the step (c) comprises the steps of:

(c-1) extracting the bottom of a rear wheel or the end of a lower shadow area of the forward vehicle, and recognizing the bottom of the rear wheel or the end of the lower shadow area as a distance reference point;

(c-2) subtracting a relative distance to the distance reference point from a relative distance to the contour candidate point through Equation 4 below;

(c-3) determining whether the subtraction result of the step (c-2) is constant over time within a predetermined error range; and (c-4) determining that the corresponding contour candidate point belongs to the vehicle, when it is determined at the step (c-3) that the subtraction result of the step (c-2) is not constant over time:

$$Zc0 - Z0 = \lambda \frac{h}{yc0} - \lambda \frac{h}{y0}, \quad \text{Equation 4}$$

where Zc0 represents the relative distance to the contour candidate point, Z0 represents the relative distance to the distance reference point, yc0 represents the height of the contour candidate point in the image taken by the camera, and y0 represents the height of the distance reference point in the image taken by the camera.

5. The forward collision warning method of claim 1, wherein the step (c) comprises the steps of:

(c-1) extracting the bottom of a rear wheel or the end of a lower shadow area of the forward vehicle, and recognizing the bottom of the rear wheel or the end of the lower shadow area as a distance reference point;

(c-2) calculating a height of the contour candidate point relative to the distance reference point through Equation 5 below;

(c-3) determining whether the calculation result of the step (c-2) is constant over time within a predetermined error range; and (c-4) determining that the corresponding contour candidate point belongs to the vehicle, when it is determined at the step (c-3) that the calculation result of the step (c-2) is constant over time:

$$Yc0 = h\left(1 - \frac{yc0}{y0}\right), \quad \text{Equation 5}$$

where Yc0 represents the height of the contour candidate point, yc0 represents a height of the contour candidate point in the image taken by the camera, and y0 represents a height of the distance reference point in the image taken by the camera.

6. A forward collision warning system that detects a forward vehicle and warns of a collision with the forward vehicle, the forward collision warning system comprising:

a camera configured to take an image of a forward situation of a vehicle;

a contour candidate point extraction unit configured to extract a contour candidate point of an object considered as a forward vehicle from the image taken by the camera;

a contour point determination unit configured to track a movement of the contour candidate point, determine whether the contour candidate point belongs to the vehicle, and set the contour candidate point to a vehicle contour point when the contour candidate point belongs to the vehicle;

a relative distance calculation unit configured to calculate a relative distance to the forward vehicle based on the vehicle contour point using Equation 6 below; and a TTC calculation unit configured to calculate a TTC using the relative distance calculated by the relative distance calculation unit:

$$Z = \lambda \frac{h - Yc}{yc}, \quad \text{Equation 6}$$

where Z represents the relative distance between an ego vehicle and the forward vehicle, $\lambda$ represents a focal distance of the camera, h represents a height of the camera, Yc represents a height of the vehicle contour point from the ground surface, and yc represents a height of the vehicle contour point in the image taken by the camera.

7. The forward collision warning system of claim 6, wherein the contour candidate point extraction unit extracts a point at which a horizontal edge and a vertical edge cross each other in the image taken by the camera, as the contour candidate point.

8. The forward collision warning system of claim 6, wherein the contour point determination unit comprises a relative distance tracking unit configured to extract the bottom of a rear wheel or the end of a lower shadow area of the forward vehicle, recognize the bottom of the rear wheel or the end of the lower shadow area as a distance reference point, determine whether a result obtained by subtracting a relative distance to the distance reference point from a relative distance to the contour candidate point through Equation 4 below is constant over time, and determine that the corresponding contour candidate point belongs to the vehicle, when the subtraction result is not constant over time:

$$Zc0 - Z0 = \lambda \frac{h}{yc0} - \lambda \frac{h}{y0}, \quad \text{Equation 4}$$

where Zc0 represents the relative distance to the contour candidate point, Z0 represents the relative distance to the distance reference point, yc0 represents a height of the contour candidate point in the image taken by the camera, and y0 represents a height of the distance reference point in the image taken by the camera.

9. The forward collision warning system of claim 6, wherein the contour point determination unit comprises a height tracking unit configured to extract the bottom of a rear wheel or the end of a lower shadow area of the forward vehicle, recognize the bottom of the rear wheel or the end of the lower shadow area as the distance reference point, determine whether a height of the contour candidate point relative to the distance reference point through Equation 5 below is constant over time, and determine that the contour candidate point belongs to the vehicle, when the height of the contour candidate point is constant over time:

$$Yc0 = h\left(1 - \frac{yc0}{y0}\right), \qquad \text{Equation 5}$$

where Yc0 represents the height of the contour candidate point, yc0 represents the height of the contour candidate point in the image taken by the camera, and y0 represents a height of the distance reference point in the image taken by the camera.

\* \* \* \* \*